United States Patent
Weilage

(10) Patent No.: US 9,441,778 B1
(45) Date of Patent: Sep. 13, 2016

(54) APPARATUS FOR DRAINING A WATERLOGGED PRESSURE BLADDER TANK

(71) Applicant: Seth D. Weilage, Council Bluffs, IA (US)

(72) Inventor: Seth D. Weilage, Council Bluffs, IA (US)

(*) Notice: Subject to any disclaimer, the term of this patent is extended or adjusted under 35 U.S.C. 154(b) by 0 days.

(21) Appl. No.: 14/665,034

(22) Filed: Mar. 23, 2015

(51) Int. Cl.
| F16K 43/00 | (2006.01) |
| F16K 51/00 | (2006.01) |
| F16L 55/18 | (2006.01) |
| F16L 55/07 | (2006.01) |
| F16L 41/16 | (2006.01) |
| F16N 31/00 | (2006.01) |

(52) U.S. Cl.
CPC ............ *F16L 55/07* (2013.01); *F16L 41/16* (2013.01); *F16N 31/00* (2013.01); *F17C 2205/00* (2013.01); *Y10T 137/6123* (2015.04)

(58) Field of Classification Search
CPC ........ F16L 55/07; F16L 41/16; F24D 3/1016
See application file for complete search history.

(56) References Cited

U.S. PATENT DOCUMENTS

| 2,949,276 | A * | 8/1960 | Merritt | A01J 5/044 251/146 |
| 4,784,174 | A * | 11/1988 | Ryan | F16L 55/07 137/15.17 |
| 5,396,814 | A * | 3/1995 | Tuttle | F16L 41/04 137/15.01 |
| 7,322,488 | B2 * | 1/2008 | Lombari | B29C 65/562 138/30 |
| 7,552,742 | B2 * | 6/2009 | Dole | F16L 41/06 137/238 |
| 7,824,144 | B2 * | 11/2010 | Wilson | B62B 3/04 248/139 |
| 2005/0284873 | A1 * | 12/2005 | Albert | F17C 1/08 220/581 |
| 2008/0017653 | A1 * | 1/2008 | Carter | F24D 3/1008 220/723 |
| 2013/0180993 | A1 * | 7/2013 | Pichette | F24D 3/1016 220/530 |

* cited by examiner

Primary Examiner — Craig Schneider
Assistant Examiner — Kevin Barss
(74) Attorney, Agent, or Firm — Dennis L. Thomte; Thomte Patent Law Office LLC

(57) ABSTRACT

An apparatus for draining the water from a waterlogged pressure bladder tank wherein the apparatus uses a drill bit which may be drilled through the tank and then passed outwardly through a valve member to a suitable drain.

2 Claims, 6 Drawing Sheets

APPARATUS FOR DRAINING A WATERLOGGED PRESSURE BLADDER TANK

BACKGROUND OF THE INVENTION

1. Field of the Invention

This invention relates to an apparatus for draining water from the air pressure chamber of a pressure bladder tank which has become waterlogged due to a failure of the bladder of the pressure bladder tank.

2. Description of the Related Art

Bladder pressure tanks are commonly used in conjunction with waterwells to supply water under pressure to a household or a commercial facility. A bladder pressure tank contains pressurized air and water separated by a flexible bladder. These tanks are typically pre-charged with air at the factory. As water pressure changes, the volume of air in the bladder tank contracts and expands. If it appears that a bladder tank is not operating correctly, the bladder inside the tank may have a tear or a hole in it. In that case, the air pressure chamber of the pressure bladder tank becomes filled with water or becomes waterlogged. If the bladder becomes inoperative, it is frequently necessary to replace the bladder pressure tank. If the pressure bladder tank is filled with water, the tank will be extremely heavy for a person to remove the pressure tank from service. Although many of the pressure bladder tanks have a discharge valve for discharging water from beneath the bladder, those prior art discharge valves do not function to drain water from the waterlogged air pressure chamber of the tank.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

An apparatus is disclosed for use with a pressure bladder tank having upper and lower ends, an internal compartment in the tank having upper and lower ends, a flexible bladder in the lower end of the internal compartment which separates the internal compartment into a pressurized air chamber above the bladder and a water chamber below the bladder. The apparatus of this invention includes a tee fitting having a first open end, a second open end in line with the first open end, and a third open end which extends transversely with respect to the first and second open ends. A first seal is positioned in the first open end of the tee fitting and a second seal is positioned in the second open end of the tee fitting. The apparatus also includes an angle valve assembly having an inlet end and a discharge end with the inlet end of the valve assembly being in fluid communication with the third open end of the tee fitting. The discharge end of the angle valve assembly is configured to have a water drain hose secured thereto. The angle valve assembly includes a movable valve member positioned between the inlet and the discharge ends thereof. The apparatus also includes an elongated drill bit having an outer shank and an inner cutting end. The drill bit extends through the first seal in the first open end of the tee fitting and through the second seal in the second open end of the tee fitting. An adjustable strap is operatively secured to the tee fitting which may be extended around the tank to hold the second open end of the tee fitting in sealed engagement with the exterior of the tank so that the drill bit may be rotated to drill into the internal compartment of the tank to drain water from the internal compartment in the event that the pressurized air chamber has become waterlogged due to a failure of the bladder. The tee fitting may be positioned adjacent to the lower end of the tank so that the drill bit drills through the bladder into the internal compartment.

When the drill bit is pulled from the opening in the tank and the valve member is in the open position, the water from the internal compartment of the tank is drained through the discharge end of the angle valve assembly.

It is therefore a principal object of the invention to provide an apparatus for draining the water from a waterlogged pressure bladder tank.

A further object of the invention is to provide an apparatus of the type described which is conveniently attached to a pressure bladder tank to facilitate the drilling of an opening into the internal compartment of the tank so that water may be drained from the internal compartment to a drain or the like located some distance from the tank thereby reducing the weight of the tank.

A further object of the invention is to provide an apparatus of the type described which is economical of manufacture, durable in use and refined in appearance.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
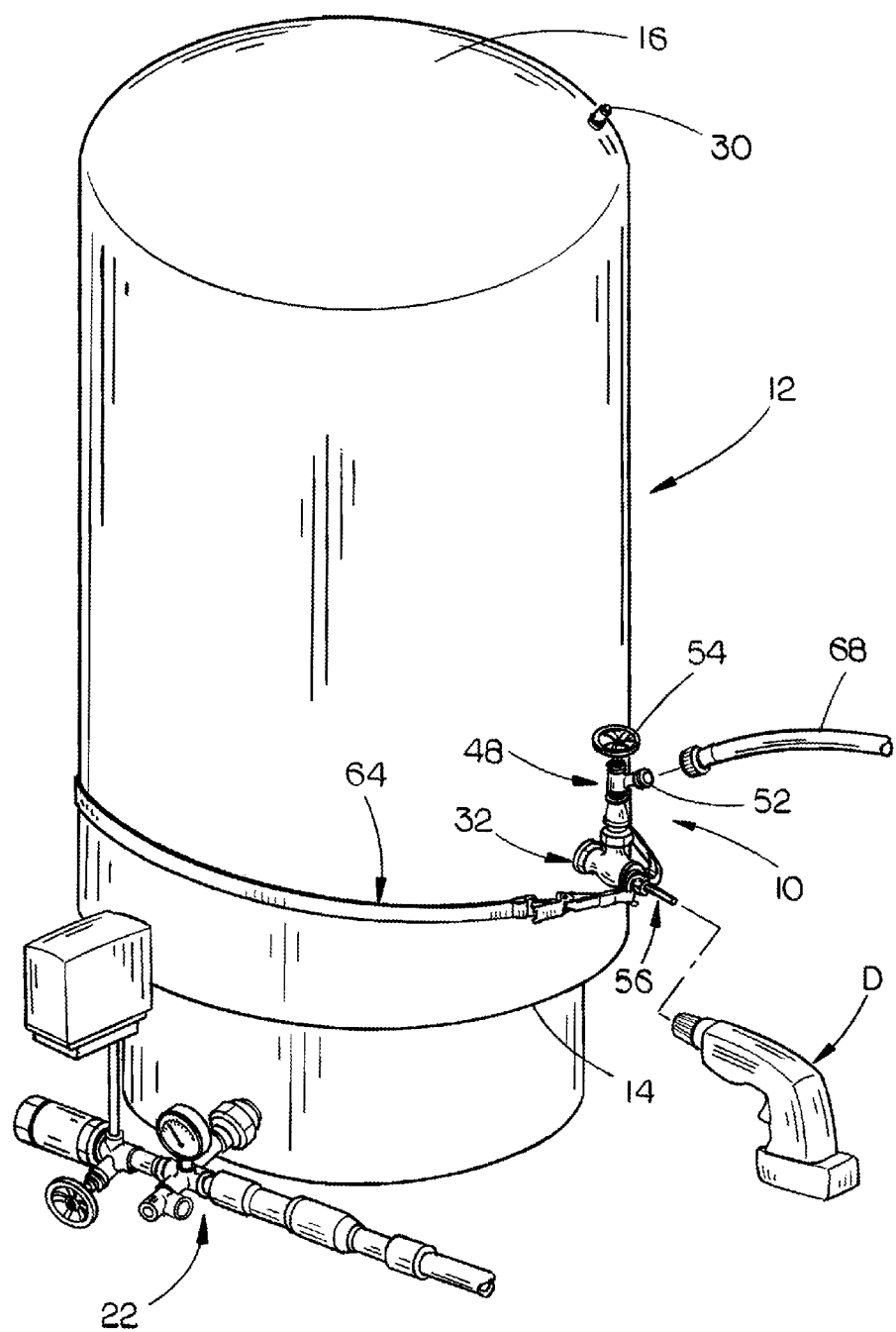
FIG. 1 is a perspective view illustrating the apparatus of this invention mounted on a pressure bladder tank.
Figure 2:
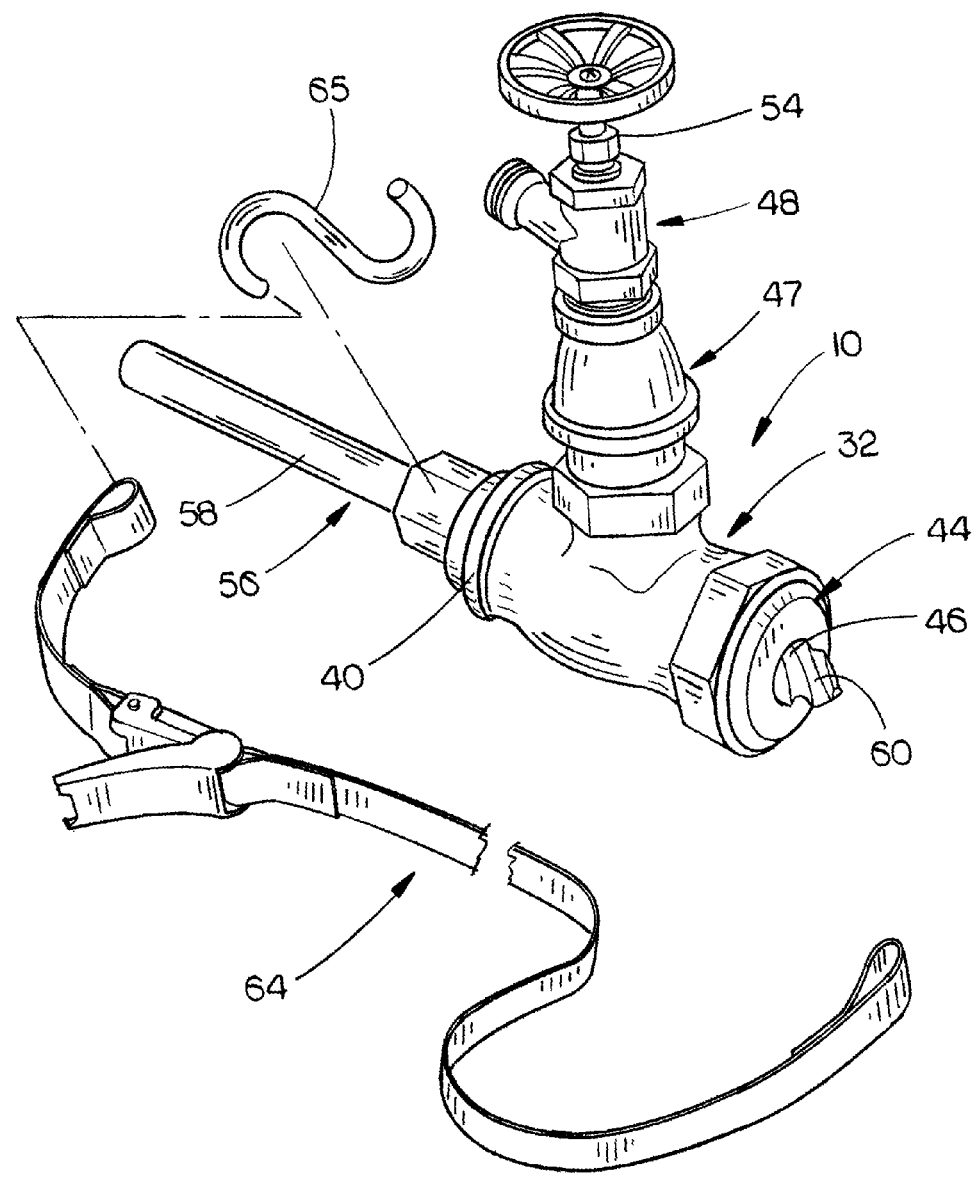
FIG. 2 is a perspective view of the apparatus of this invention.
Figure 3:
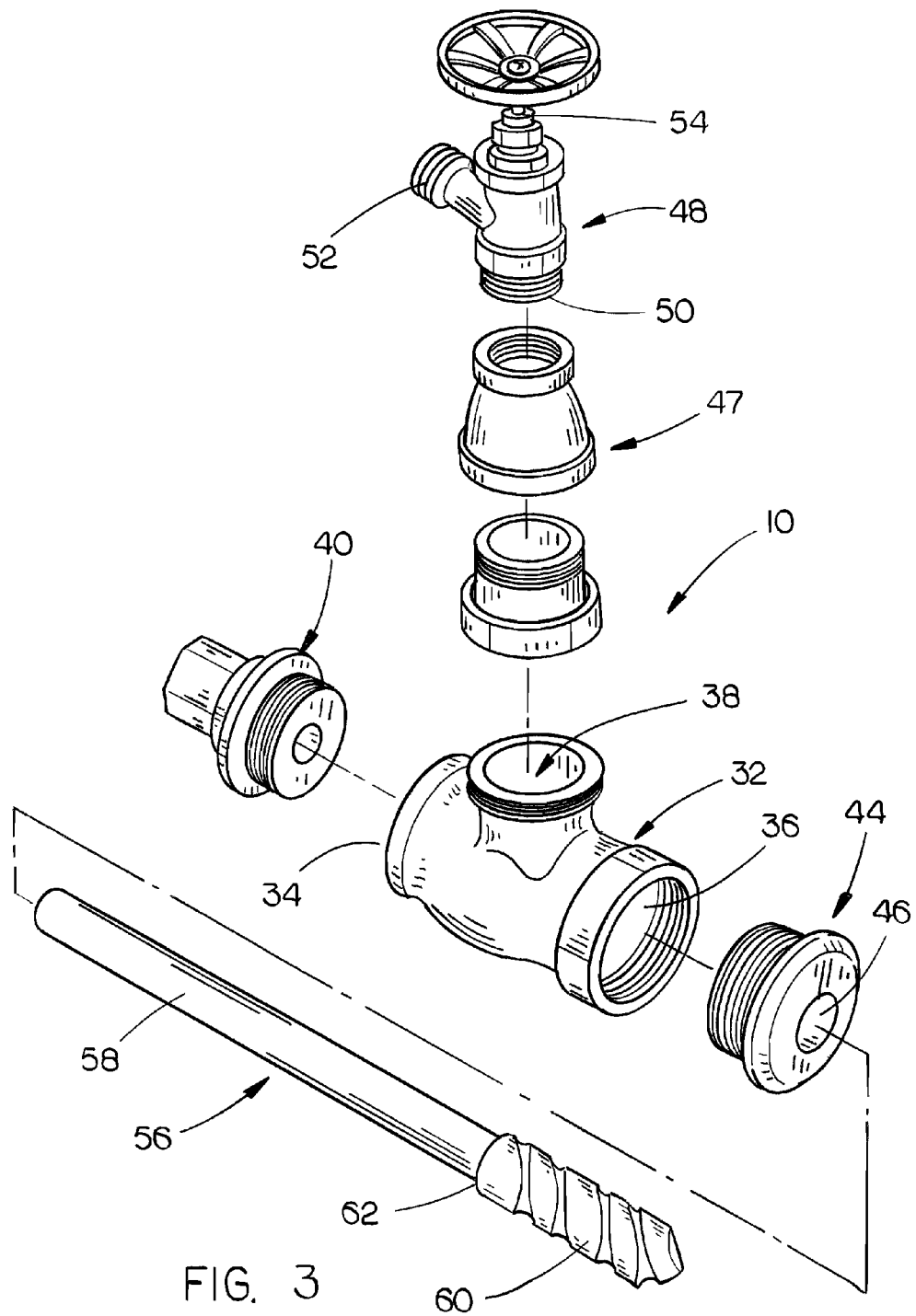
FIG. 3 is a partial exploded perspective view of the apparatus of this invention.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The apparatus of this invention is generally referred to by the reference numeral 10 and is designed to be used with a pressure bladder tank 12 of conventional design. Tank 12 includes a lower end 14 and an upper end 16. Tank 12 has an opening (not shown) formed therein to permit water to be pumped into the lower end of internal compartment 20 of tank 12 and withdrawn therefrom by way of conventional valving generally designated by the reference numeral 22. A conventional bladder 24 is positioned within internal compartment 20 to separate the internal compartment 20 into an air pressure chamber 26 above the bladder 24 and a water chamber 28 below the bladder 24. Tank 12 includes a Schrader valve 30 at the upper end thereof which is in communication with the air pressure chamber 26 to charge the same in conventional fashion.

Figure 5:
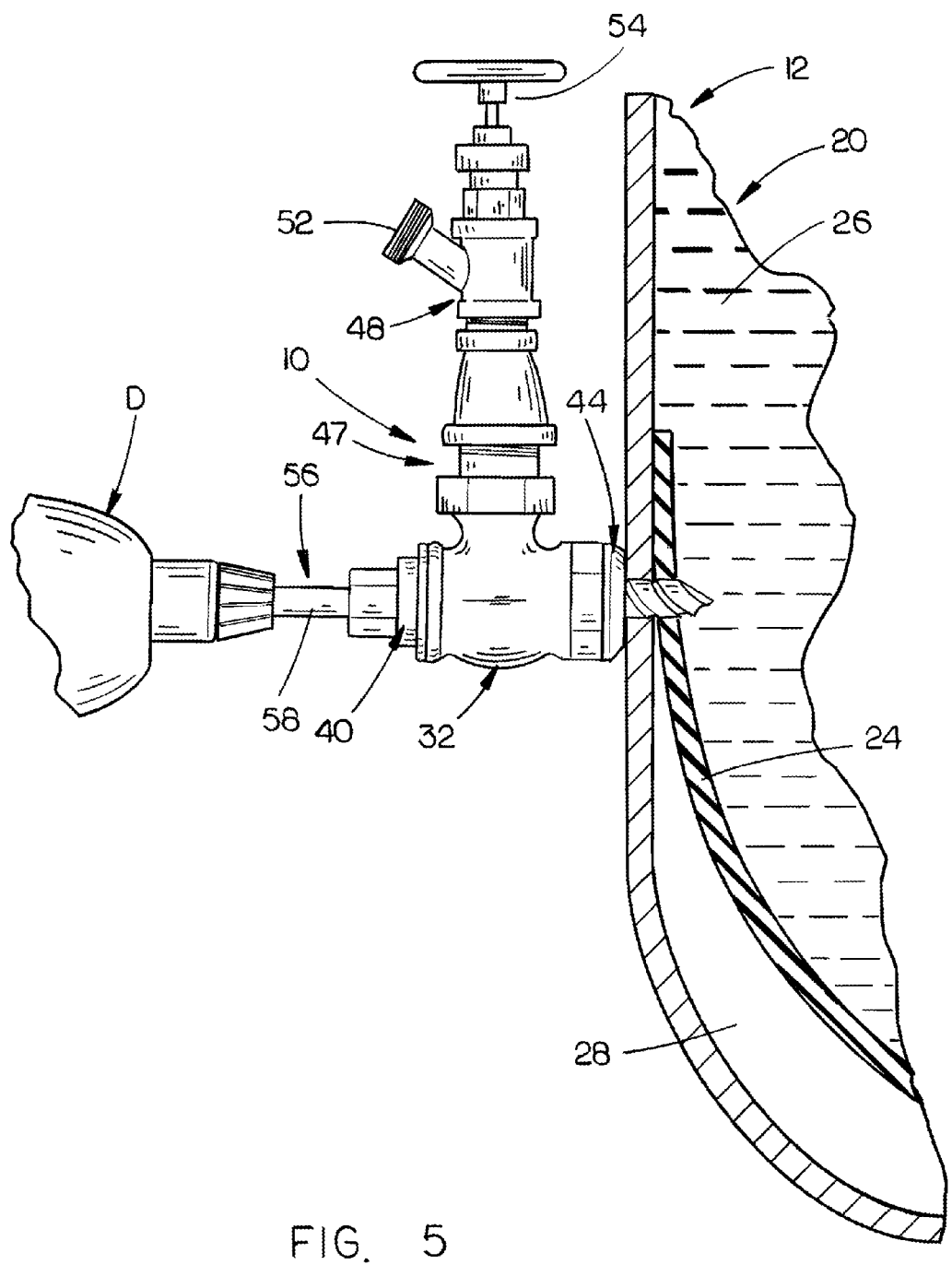
FIG. 5 is a side view of the apparatus of this invention drilling a hole through the tank and bladder which are shown in section.
Figure 6:
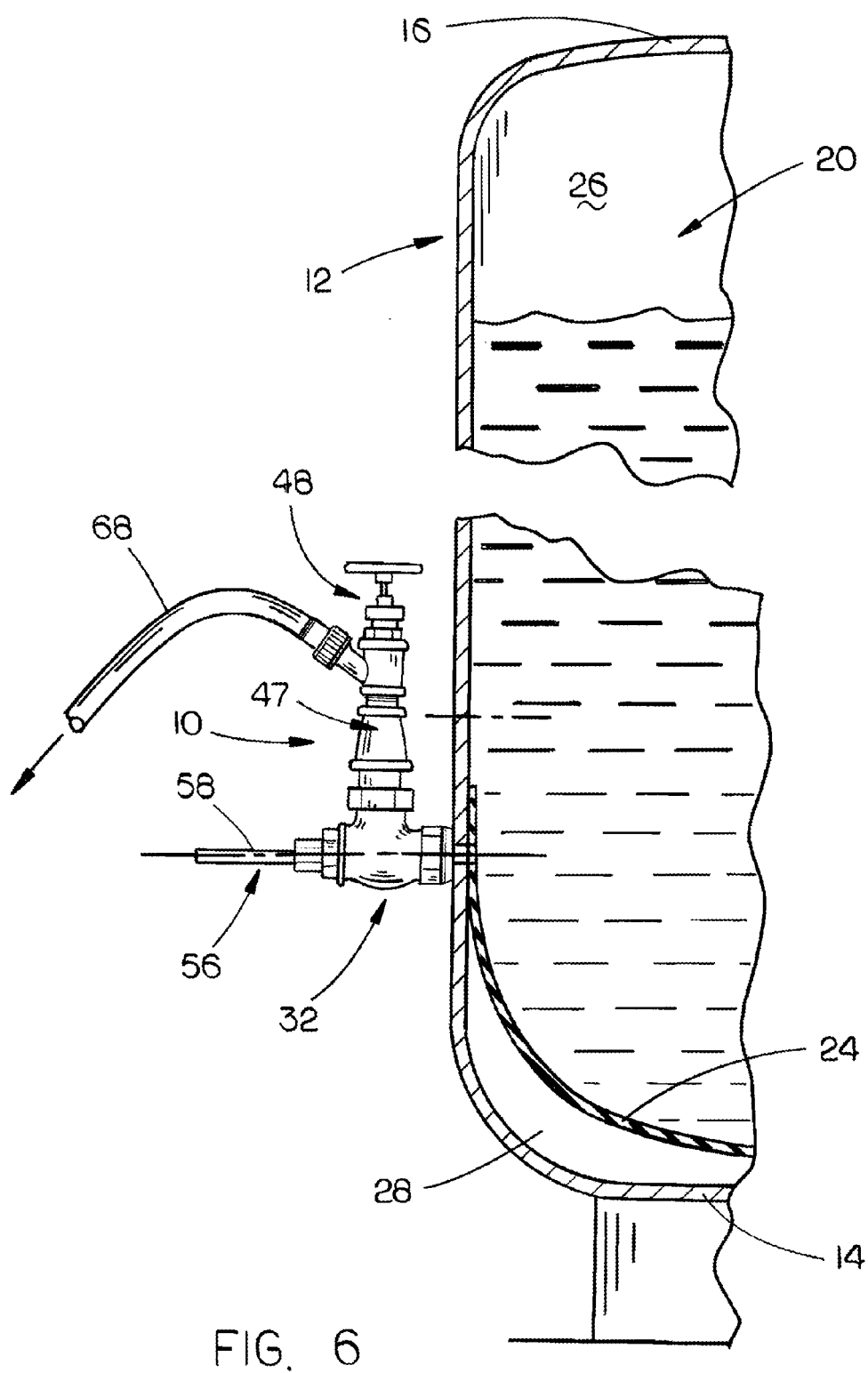
FIG. 6 is a side view of the apparatus illustrating how water is drained from the waterlogged air pressure chamber which is shown in section.

If the bladder 24 fails, water from the water chamber 28 will fill the air pressure chamber 26 to create a "waterlogged" condition, as seen in FIGS. 5 and 6. The apparatus 10 is designed to permit the water within the air pressure chamber 26 to be drained therefrom to reduce the weight of the waterlogged tank to facilitate the removal and replacement of the tank as will now be described.

Figure 4:
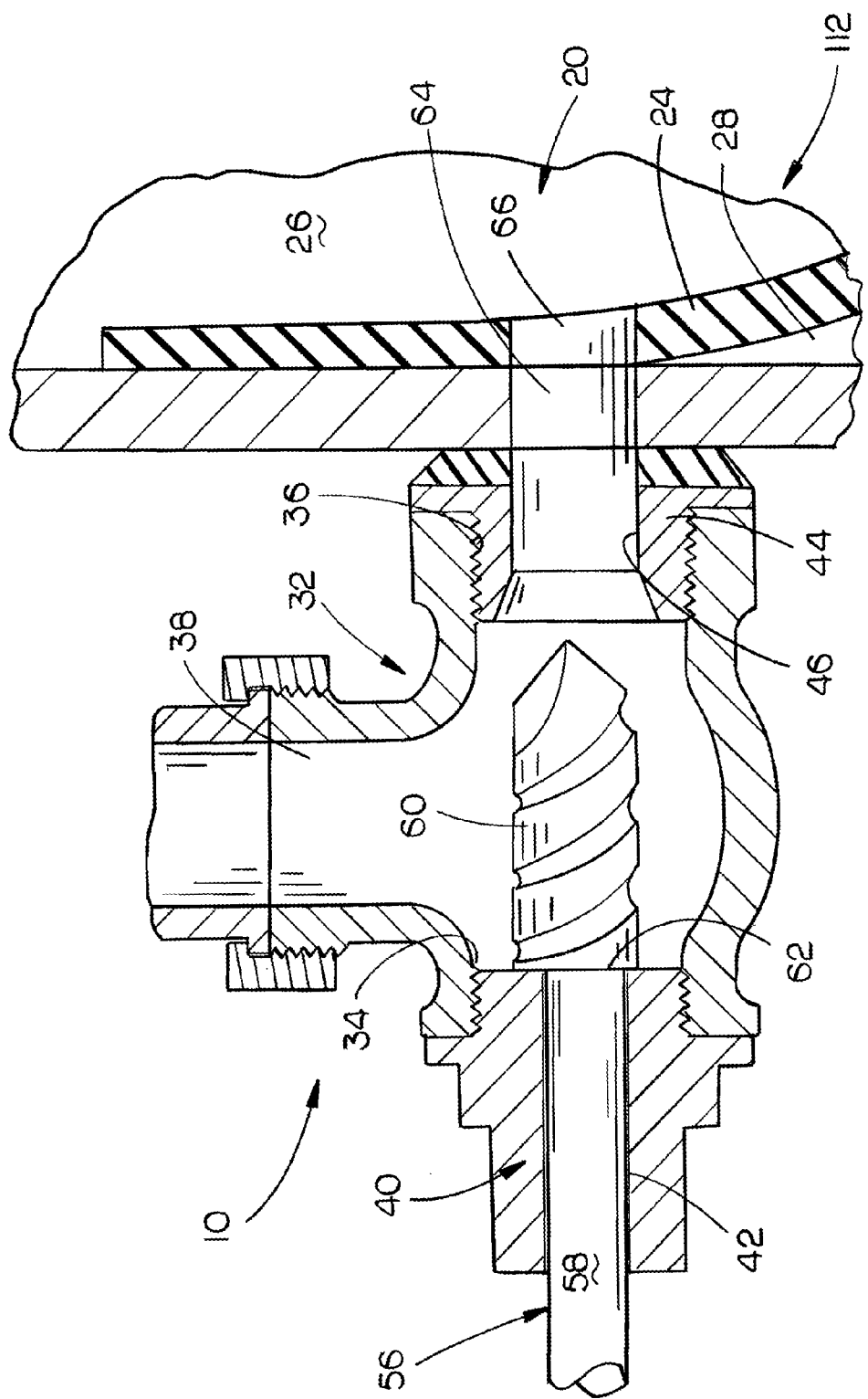
FIG. 4 is a partial sectional view of the apparatus of this invention which illustrates a hole being drilled through the side wall of a pressure bladder tank and through the bladder of the tank.

Apparatus 10 includes a tee fitting 32 having a first open end 34, a second open end 36 and a third open end 38. As seen in FIG. 4, the first open end 34 is in line with the second open end 36. A packing gland or seal 40 is positioned in open end 34 and has a central opening 42 formed therein. A seal 44 is positioned in open end 36 and has a central opening 46 formed therein. As seen in FIG. 4, the outer end of seal 44 protrudes somewhat from open end 36. The numeral 48 refers to an angle valve which has its inlet end 50 operatively secured to open end 38 of tee fitting 32 by a union or other plumbing fixture 47. Angle valve 48 includes an exteriorly threaded discharge end 52 which extends therefrom. Angle valve 48 includes a valve member 54 which selectively prevents water from passing outwardly from discharge end 52.

The numeral 56 refers to an elongated drill bit having an outer shank portion 58 and an inner fluted cutting portion 60. Preferably cutting portion 58 has a stepped down portion 62 at the outer end of cutting portion 58. Prior to packing gland 40 being secured to tee fitting 32, the shank portion 58 of drill bit 56 is extended outwardly through opening 42 of packing gland 40. The packing gland 40 is then secured to the fitting 32.

The numeral 64 refers to a conventional strap assembly which has one end operatively secured to the apparatus 10 by a hook 65. Strap 64 is extended or wrapped around the tank 12 so that the outer portion of seal 44 is in sealing engagement with the exterior surface of tank. The other end of strap 64 is secured to the buckle of the strap 64 in conventional fashion. The apparatus will usually be positioned at the exterior side of the tank below the upper outer end of the bladder 24.

A drill D is then connected to the shank 58 of drill bit 56. At this time the valve member 54 will be in its closed position. The cutting edge 60 of drill bit 56 is then placed into engagement with the exterior surface of the tank 12. The drill D is then operated to drill a hole 64 through the wall of the tank 12 and to drill a hole 66 through the bladder 24. The drill bit 56 is then partially withdrawn with respect to the tank 12 so that the drilled hole 64 in the tank 12 communicates with the interior of the tee fitting 32. At that time, the stepped-down portion 62 will be in sealing engagement with the inner end of gland 40. A garden hose 68 or the like will be secured to the outlet end 52 of angle valve 48 if not already secured thereto. The discharge end of the hose 68 will be placed in communication with a floor drain or the like. The valve member 54 is then opened so that the water within the air pressure chamber 26 will be drained therefrom. Once the water has been drained from the air pressure chamber 26, the apparatus 10 is removed from the tank 12. At that time, the weight of the tank 12 will be considerably less to enable the pressure tank 12 to be taken out of service.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. An apparatus for draining a waterlogged air pressure chamber of a pressure bladder tank which has upper and lower ends, an internal compartment in the pressure bladder tank having upper and lower ends, a flexible bladder in the lower end of the internal compartment which normally separates the internal compartment into a pressurized air chamber above the bladder and a water chamber below the bladder, comprising:

a tee fitting having a first open end, a second open end in line with said first open end, and a third open end which extends transversely with respect to said first and second open ends;

a first seal in said first open end of said tee fitting;

said first seal having an inner end and an outer end;

said first seal having a central opening formed therein which extends between said outer and inner ends thereof;

a second seal in said second open end of said tee fitting;

said second seal having an inner end and an outer end;

said second seal having a central opening formed therein which extends between said outer and inner ends thereof;

a valve assembly having an inlet end and a discharge end;

said inlet end of said valve assembly being in fluid communication with said third open end of said tee fitting;

said discharge end of said valve assembly being configured to have a water drain hose secured thereto;

said valve assembly including a selectively movable valve member positioned between said inlet end and said discharge end thereof;

an elongated drill bit having an outer shank end and an inner cutting end;

said outer shank end of said drill bit having inner and outer ends;

said inner cutting end of said drill bit having inner and outer ends;

said inner cutting end of said drill bit having a greater diameter than the diameter of said outer shank end of said drill bit thereby creating a stepped-down portion between said inner end of said outer shank end and said outer end of said inner cutting end of said drill bit;

said outer shank end of said drill bit being longitudinally movably mounted in said central opening of said first seal;

said drill bit being longitudinally movable between outer and inner positions with respect to said tee fitting;

said stepped-down portion of said drill bit being in sealing engagement with said inner end of said first seal when said drill bit is in said outer position;

said inner end of said inner cutting end of said drill bit extending through said central opening in said second seal to be in drilling engagement with the tank when said drill bit is in said inner position;

an adjustable strap operatively secured to said tee fitting which may be extended around the tank to hold said second open end of said tee fitting in sealed engagement with the exterior of the tank so that said drill bit may be rotated to drill into the waterlogged air pressure chamber of the tank to drain water from the waterlogged pressure chamber.

2. The apparatus of claim 1 wherein said tee fitting is positioned adjacent the lower end of the tank so that the drill bit drills through the bladder.

\* \* \* \* \*